Dec. 11, 1923.
C. A. HERLE
WHEEL
Filed Jan. 18, 1921
1,476,968
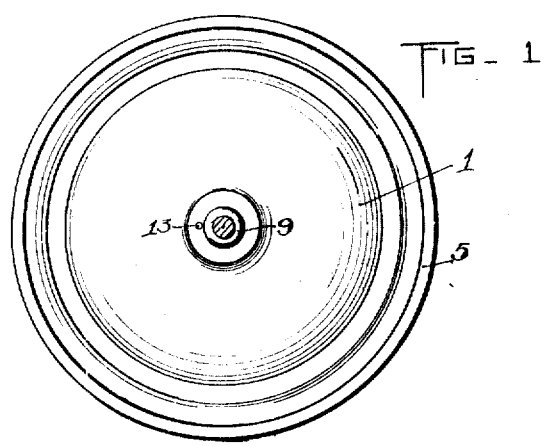
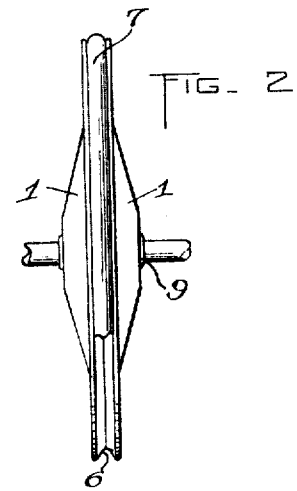
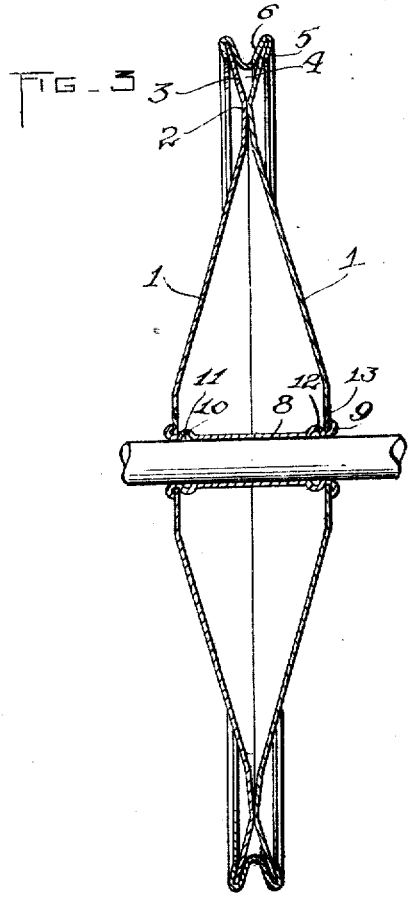
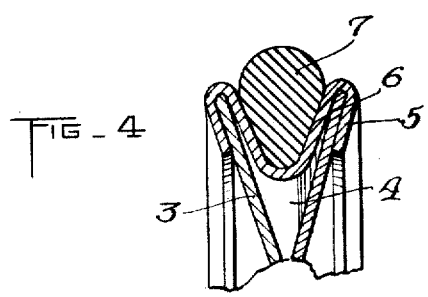
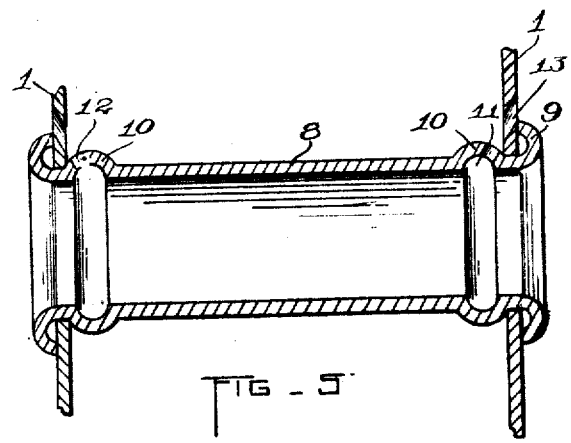
INVENTOR
Chester A. Herle
BY
Davis & Timm
his ATTORNEYS Patented Dec. 11, 1923.

1,476,968

UNITED STATES PATENT OFFICE.

CHESTER A. HERLE, OF ROCHESTER, NEW YORK, ASSIGNOR TO BESSTEEL PRODUCTS COMPANY, INC., OF ROCHESTER, NEW YORK, A CORPORATION OF NEW YORK.

WHEEL.

Application filed January 18, 1921. Serial No. 438,219.

*To all whom it may concern:*

Be it known that I, CHESTER A. HERLE, a citizen of the United States, and resident of Rochester, in the county of Monroe and State of New York, have invented certain new and useful Improvements in Wheels, of which the following is a specification.

The present invention relates to wheels and more particularly to the type embodying two sheet metal disks, an object of this invention being to provide a simple and inexpensive construction which may be used on baby carriages, go-carts and other vehicles used by or for children. A further object of the invention is to provide a novel hub construction which will sustain the disks against movement toward each other, while at the same time providing lubricating grooves. Another object of the invention is to provide an improved rim construction which will hold the perimeters of the disks against movement and have a groove in which a tire may be received.

To these and other ends the invention consists of certain parts and combinations of parts, all of which will be hereinafter described, the novel features being pointed out in the appended claim.

In the drawings:

Fig. 1 is a side view of a wheel constructed in accordance with this invention;

Fig. 2 is an edge view with part of the tire broken away;

Fig. 3 is an enlarged axial section through the wheel;

Fig. 4 is an enlarged fragmentary section showing the manner in which the tire is received on the rim; and Fig. 5 is an enlarged fragmentary section showing the manner in which the hub connects with the disks.

Referring more particularly to the drawings, 1 indicates two circular sheet metal disks which are formed in such a manner that abutting portions 2 are provided adjacent the perimeters of the disk. From these abutting portions the disks flare outwardly as at 3 to provide a space 4 between them beyond the abutting portions. The disks are secured together by a rim formed, in this instance, of a sheet metal strip having its ends welded together to provide a ring, this strip being bent inwardly at 5 at its edges and abutting the outer faces of the flaring or diverging portions 3. The strip is also bent inwardly at its center so as to provide a grooved portion 6 extending in the annular recess or opening 4 between the disks and abutting the inner faces of the flaring or diverging portions. In this groove portion is received the tire 7 made of rubber or other suitable material. This construction of rim supports the flaring portions 3 both internally and externally, while at the same time providing a groove for the tire.

The hub is formed, in this instance, by a tube 8 supported centrally of the disks 1 which are spaced apart at their center and provided each with a central opening through which the hub 8 extends. The outer ends of the hubs are bent outwardly at 9 against the outer faces of the disks and between the disks, the hub is provided with two annular ribs 10 forming abutments for limiting the movement of the disks toward each other. These annular ribs 10 are of hollow formation to provide annular grooves 11 in the inner wall of the hub, serving for holding a lubricant which may be introduced through openings 12 in the annular ribs 10. In order that these openings 12 may be reached from the exterior of the disks 1, said disks are provided with openings 13 in proximity to the openings 12 in the hub so that a nozzle of an oil can may be introduced through the opening 13 into the opening 12 and discharge the oil into the groove 11.

From the foregoing it will be seen that there has been provided a wheel of novel construction which may be inexpensively manufactured. The body of the wheel is formed by two sheet metal disks which are spaced apart at the hub and are brought into abutment adjacent their peripheries, the portions beyond the abutting portions flaring and having a grooved rim secured thereto by being brought into abutment with the inner and outer faces of the flaring portions. The hub is of simple construction and has its ends bent outwardly into abutment with the outer faces of the disks, while annular ribs are provided forming abutments for the inner faces of the disks, these ribs being hollow and acting as lubricant grooves into which a lubricant may be introduced from the outer faces of the disks.

What I claim as my invention and desire to secure by Letters Patent is:

A wheel comprising two sheet metal disks provided with central openings and small openings to one side of the central openings, and a hub extending through the central openings and having ends cooperating with the outer faces of the disks and having also annular hollow ribs engaging the inner faces of the disks, for preventing inward movement of the disks, the hollow ribs opening to the interior of the hub to provide lubricant grooves, said ribs having openings adjacent the openings of the disks through which a lubricant may be introduced into the lubricant grooves.

CHESTER A. HERLE.